Figure 1C:
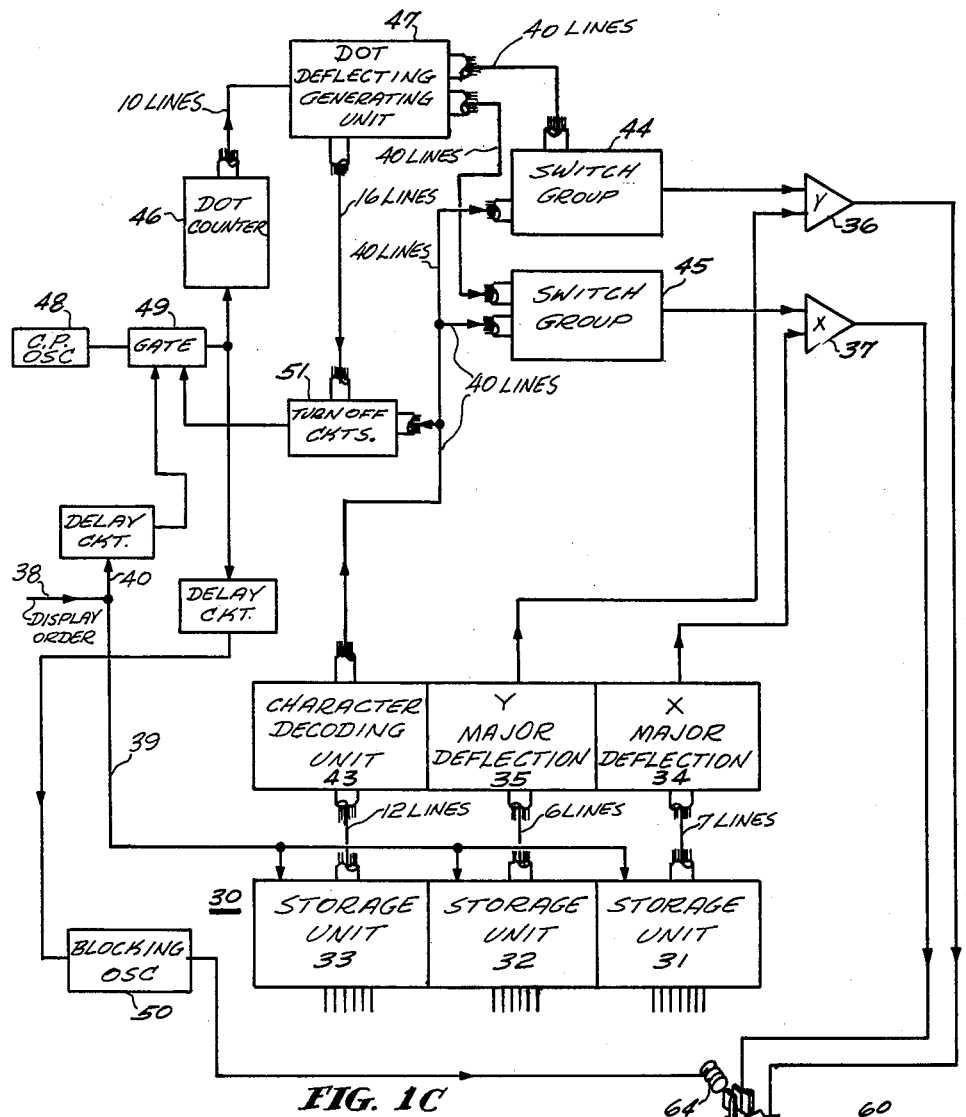

May 14, 1963

H. R. DELL 3,090,041

CHARACTER GENERATION AND DISPLAY

Filed Nov. 2, 1959

8 Sheets-Sheet 1

HAROLD R. DELL
INVENTOR

BY Delbert D. Warner

ATTORNEY

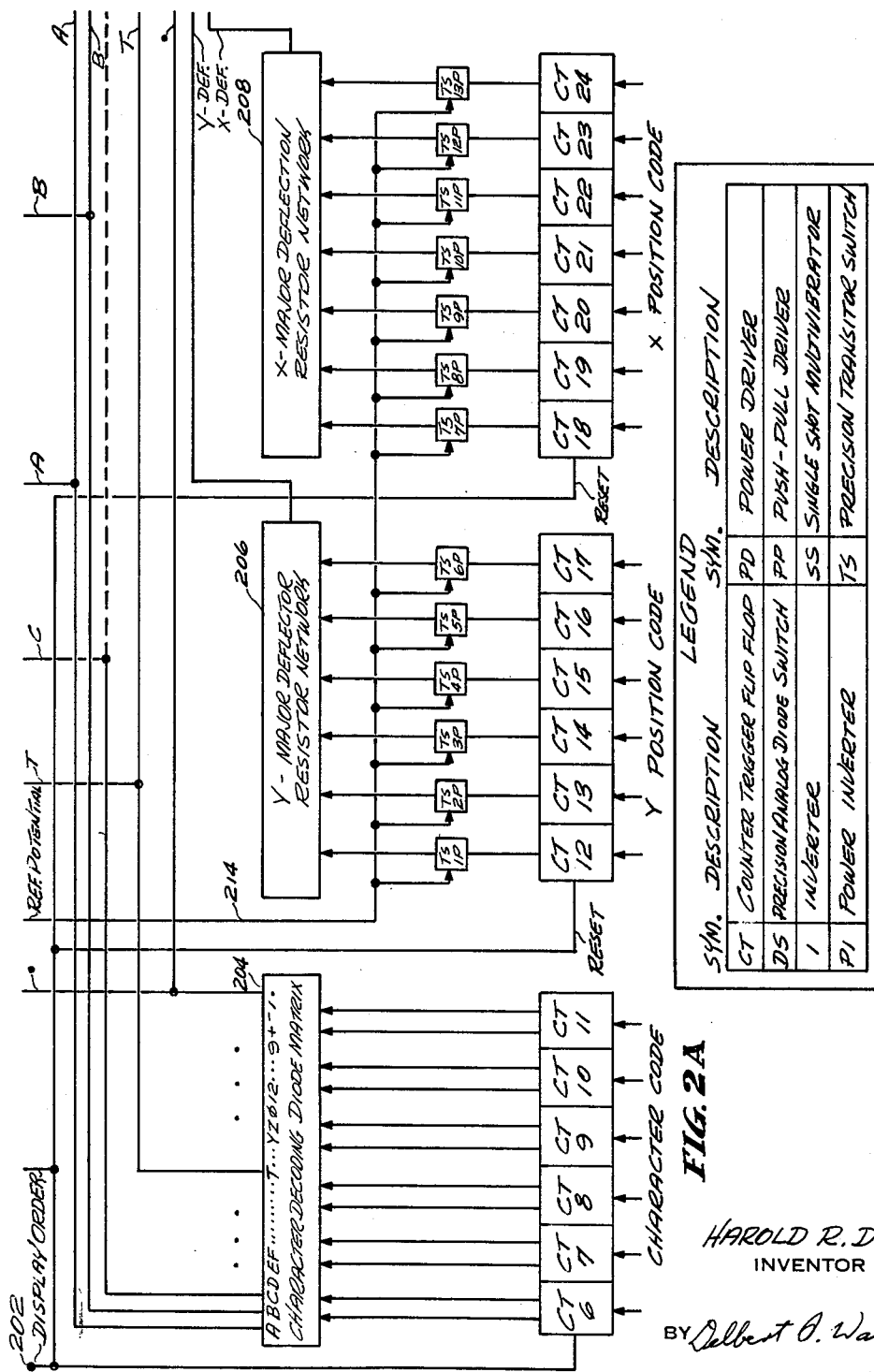

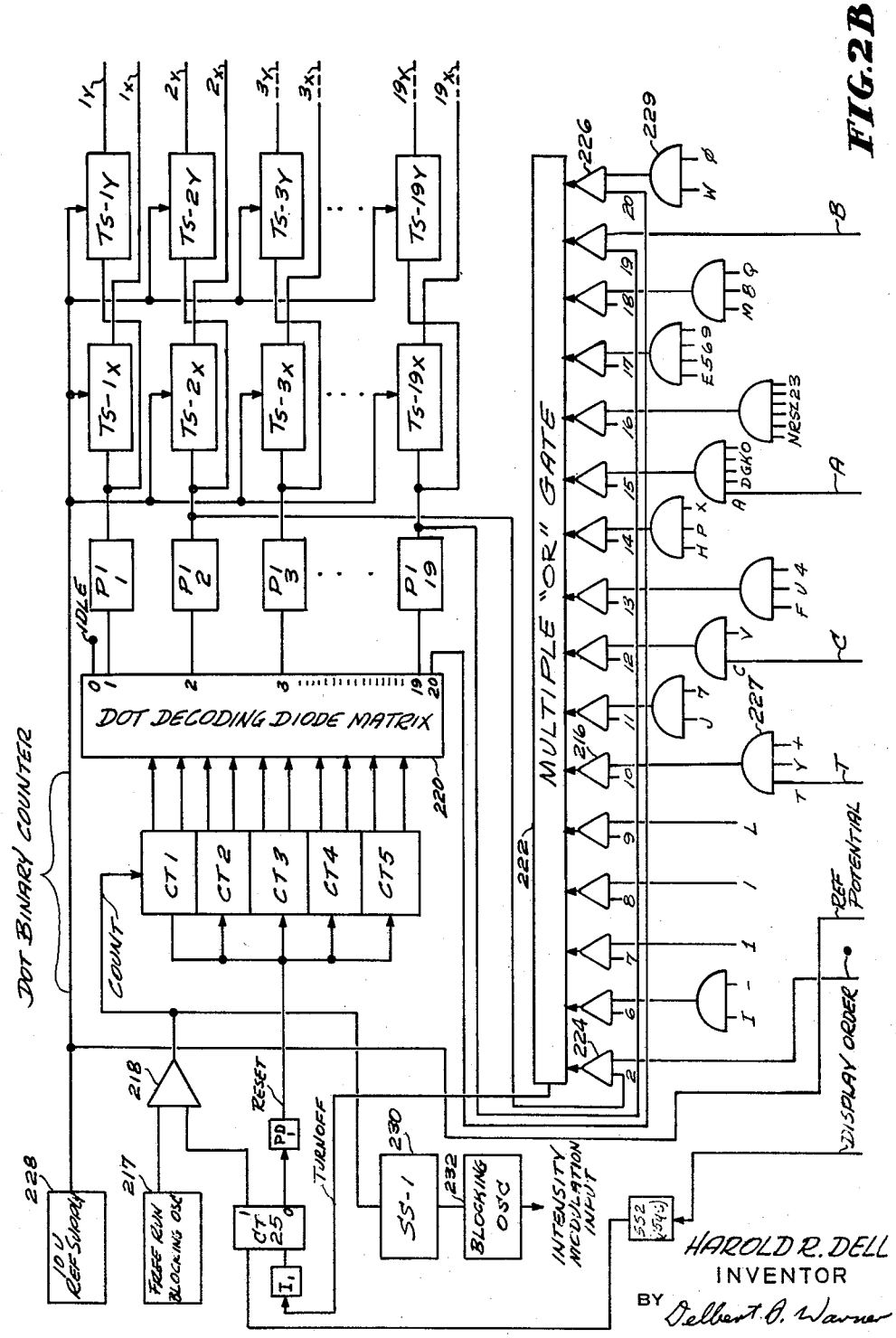

May 14, 1963

H. R. DELL 3,090,041

CHARACTER GENERATION AND DISPLAY

Filed Nov. 2, 1959

8 Sheets-Sheet 6

HAROLD R. DELL
INVENTOR

BY Delbert O. Warner

ATTORNEY

DIODE SWITCH

PUSH PULL DRIVER

United States Patent Office 3,090,041
Patented May 14, 1963

3,090,041
CHARACTER GENERATION AND DISPLAY
Harold R. Dell, Palo Alto, Calif., assignor to Link Aviation, Inc., Binghamton, N.Y., a corporation of New York
Filed Nov. 2, 1959, Ser. No. 850,308
3 Claims. (Cl. 340—324)

This invention relates to character display devices and to methods for providing character displays. More particularly, it relates to improved methods and means for displaying alphabetic or numeric characters on cathode ray tubes or other electronic display devices.

Such display devices and methods find wide utility in connection with computer and data-processing installations for indicating the results of computations and operations performed by digital computers and like apparatus. Necessary requirements of such character display devices are that they operate rapidly, that they be capable of receiving their input data in the form of computer or data-processing output signals, and that they produce clear and readily legible characters.

A number of prior art devices exist by the use of which it is possible to generate alphanumeric characters on the phosphor screen of a cathode ray tube. Three principal types of cathode-ray tube character display units are known. A first type includes units in which a shaped electron beam is generated by the electronic illumination of a mask inside the tube. The mask is provided with a plurality of apertures each having the shape of a different letter or number, and by directing an electron beam onto the mask from the electron gun a shaped beam is provided. By the use of a deflection system the shaped beam is positioned on the screen as required. A second type is that in which a scanning raster is formed at a desired position on the screen, and the tube is unblanked to form a character composed of line segments in a manner similar to the composition of a television picture. Still a third type of unit is that in which an electron beam is first positioned to a reference point and then is caused to trace out the character through the application of the X and Y component functions to a micro-deflection system.

The first of these types of character display units may be described in further detail as employing a character-shaped electron beam which is generated by the deflection of a primary electron beam to illuminate a character-matrix apertured mask electrode in the display tube, the resulting shaped electron beam is recentered, and the shaped electron beam is then deflected to the required display position on the tube screen. There are several disadvantages to this type of display unit, among which are the requirement for a special, and expensive, type of display tube. Another disadvantage is that two deflection systems are required, one for character selection, and one for positioning, each of which must be quite precise due to the chaarcteristics of these special tubes. The positioning deflection system also presents certain further limitations to the operation of this system which are due to the requirement that it deflect a shaped beam with small distortion. Also, due to distortion of the image and to phosphor-loading considerations it is not feasible to transmit a shaped beam of sufficient intensity to permit the generation of luminous characters which may be viewed conveniently under conditions in which normal room lighting is present. Also, loss of edge resolution due to beam debunching, and skew distortions are emphasized with this type of display unit. The present invention may utilize a standard cathode ray tube and none of the problems attending use of an apertured mask will arise.

The second type of prior art display unit referred to above is that in which a scanning raster is formed at the required character display position on the tube screen and the primary electron beam is unblanked by a signal generated to coincide with appropriate points on certain lines of this raster to form a character composed of line segments in a manner similar to the formation of a television picture. Such a system will be seen to require wide-band video amplifiers. The definition of the displayed characters is relatively poor by this raster presentation, and is especially poor for small characters due to the inherent resolution limitations of raster-type displays. Another shortcoming of this type of presentation is that a relatively long time is required to present the character due to the necessity of covering the character display field position with a raster sweep, from which only a few segments are unblanked for the display of each character. The present invention does not utilize a scanning raster and hence avoids the limitations of this second prior art type of display.

The last general type of these prior art cathode-ray tube character display units is that in which the continuously varying analog X and Y component voltages for the character to be displayed are generated and used to deflect the beam continuously from beginning to end of a character. In this system any point within a small character-field region of the tube screen effectively traces out the desired character on the screen in the manner it might be written by hand. The prior art devices using this general method have run into a number of difficulties, since the generation of the X and Y component deflection signals in general requires that, for each character generated, a special circuit of considerable complexity must be provided. One such system, described in the Jan. 3, 1958 edition of "Electronics," pages 72–75, utilized Fourier analysis and synthesis, requiring a plurality of harmonically related sine waves to trace out a character. Fourier composition of a curve involves taking the small differences between large opposite sense Fourier components and inherently is limited in accuracy. Furthermore, a large number of Fourier components are required to generate some characters. Also, it is not feasible to generate the sudden changes in voltage in the component signals required for the undistorted display of certain characters. Another system of the latter type which is described in the March 13, 1959 edition of "Electronics" pages 138–140, requires a separate and relatively complex number-generating circuit for each different character to be displayed. In this system characters are formed by special Lissajous patterns, and only a limited number of fairly simple characters may be produced in an undistorted manner unless very complex and expensive number-generating circuits are involved. Accurate production of Lissajous figures also requires preservation of very accurate phase relationships between vertical and horizontal deflection components. The present invention does not involve generation of characters by either composition of Fourier components or by modified Lissajous figure presentation and thereby avoids the above mentioned problems. In the present invention the location of a desired character as a whole is determined by provision of major X and Y deflection voltages, as in the case of the prior art systems, but the shape of the character itself is determined, not by an apertured mask within the tube, not by occasional unblanking of a scanning raster, and not by generation of continuous X and Y voltages by Fourier or Lissajous synthesis, but rather by provision of a series of discrete successive sets of Cartesian coordinate voltages, which successively deflect the electron beam to trace out the character in a series of discrete successive steps, producing a series of individual sharply defined dots which may blend together to provide the desired character. The individual dots formed in this way have very clean definition along their edges to permit the formation of sharp corners for any desired character.

It is a primary object of this invention, therefore, to provide improved means for generating alphanumeric characters on conventional cathode-ray tube screens.

It is another object of this invention to provide a method and means for generating characters of better definition than has been possible heretofore on cathode-ray tube screens.

It is yet another object of this invention to provide a method and means for generating alphanumeric characters of good form and of higher brilliance than has been possible heretofore on cathode-ray tube screens.

It is still another object of this invention to provide an improved method and improved means for generating characters on visual display devices through generation of successive and discrete sets of minor X and Y positioning signals.

It is a further object of this invention to provide an improved method and means for forming alphanumeric characters by placing a plurality of successive dots arranged to represent said characters on the screen of a cathode-ray tube.

It is yet a further object of this invention to provide means for forming predetermined characters on a cathode-ray tube in which said means may be readily altered to provide other characters.

It is a still further object of this invention to provide means for rapidly and accurately presenting a alphanumeric characters on the screen of a cathode-ray tube without the use of special tubes, or the loss of definition or of brilliance and without employing circuits of inordinate complexity.

Figure 1A:
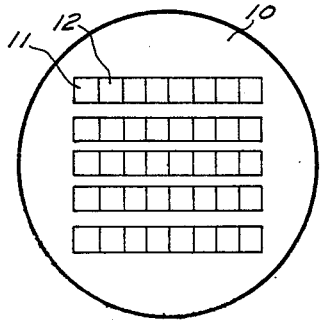
Figure 1B:
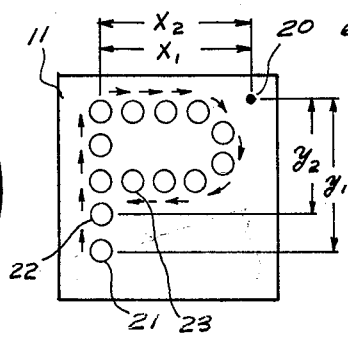
Figure 2C:
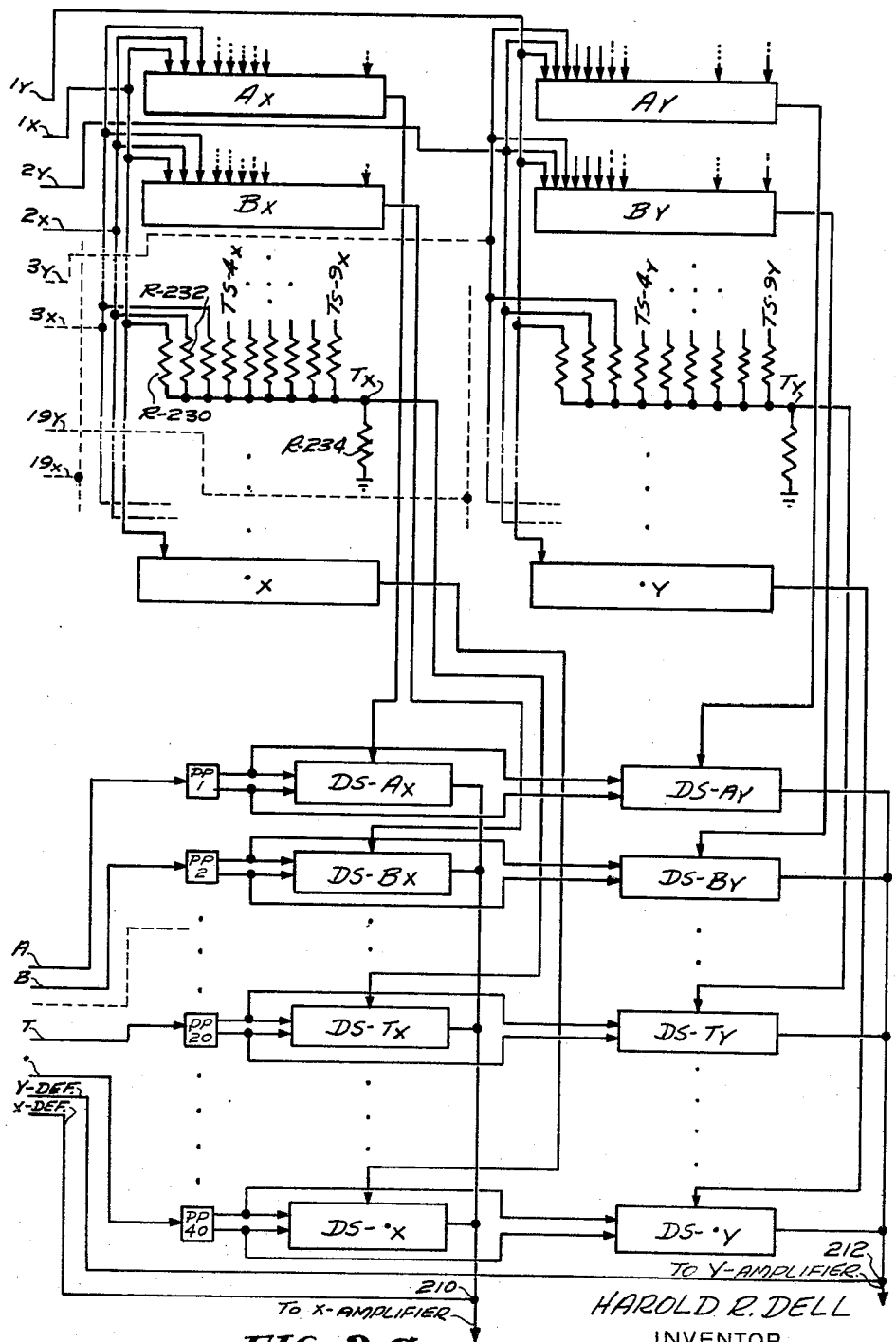
Figure 2E:
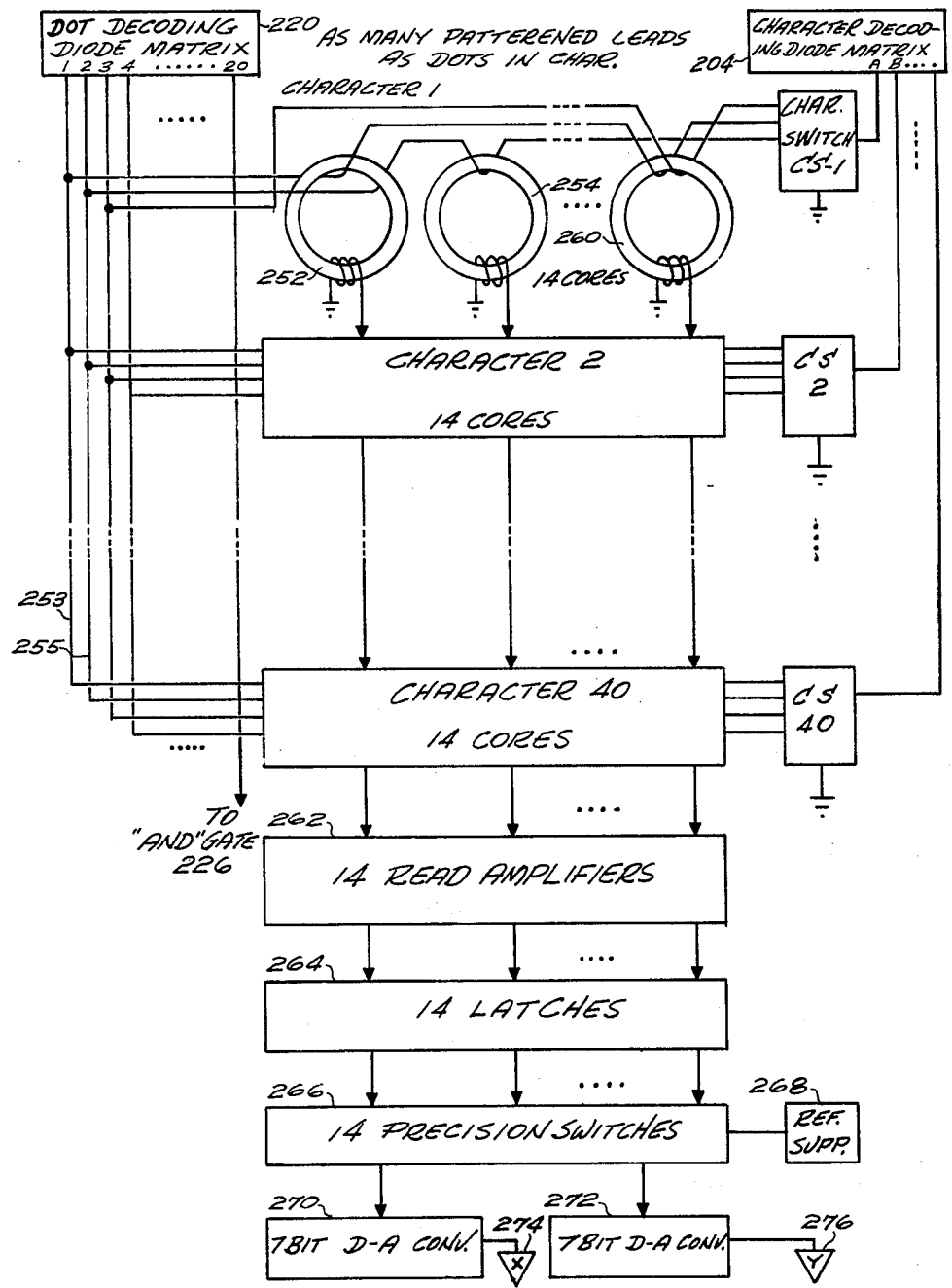
Figure 3A:
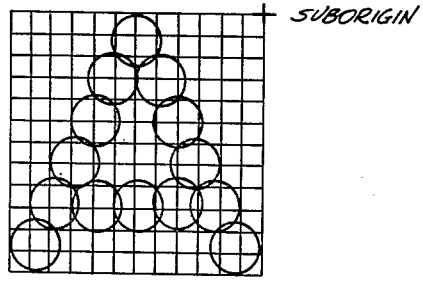
Figure 3B:
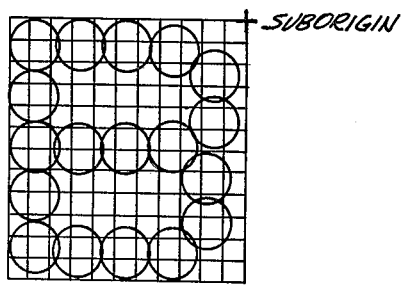
Figure 3C:
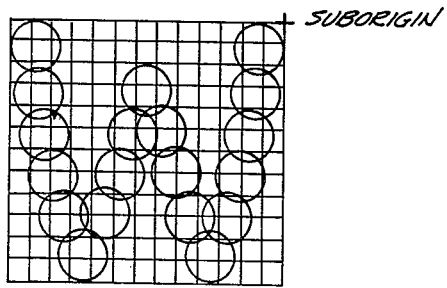
Figure 3D:
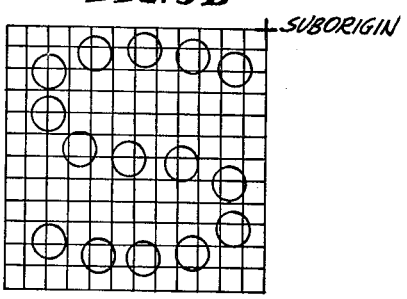
Figure 4:
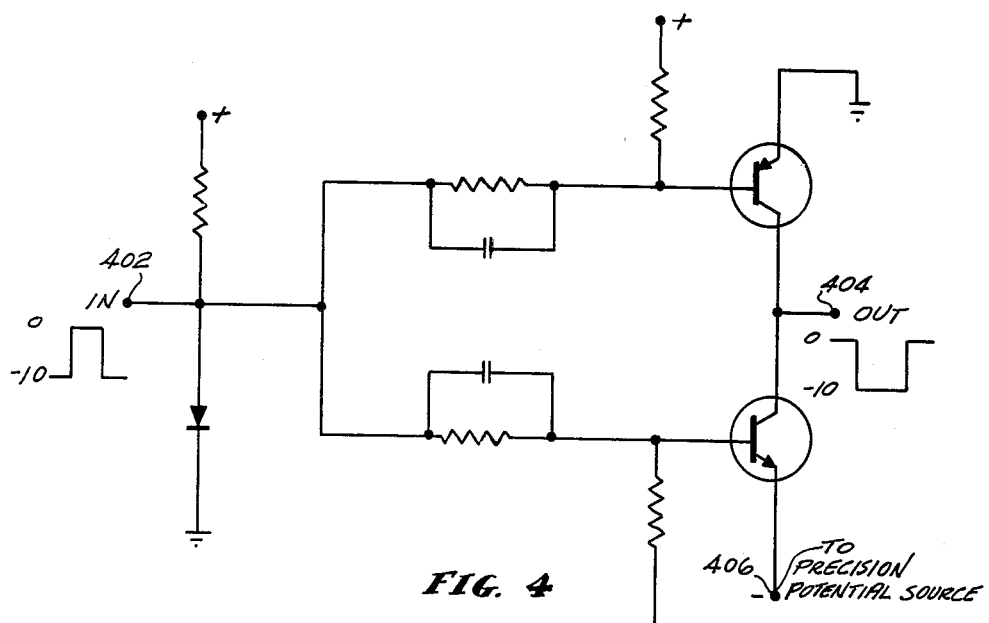
Figure 5:
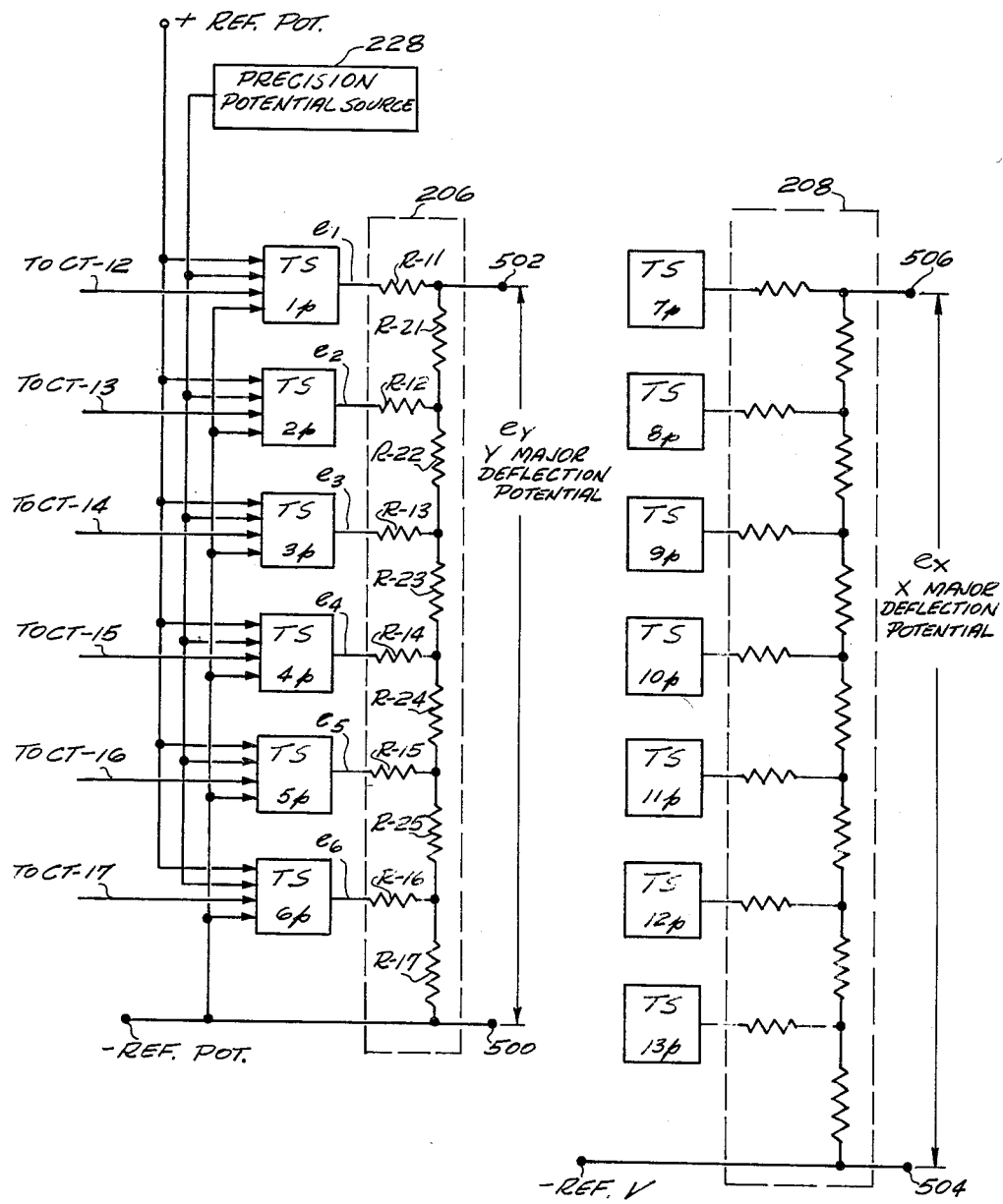
Figure 6:
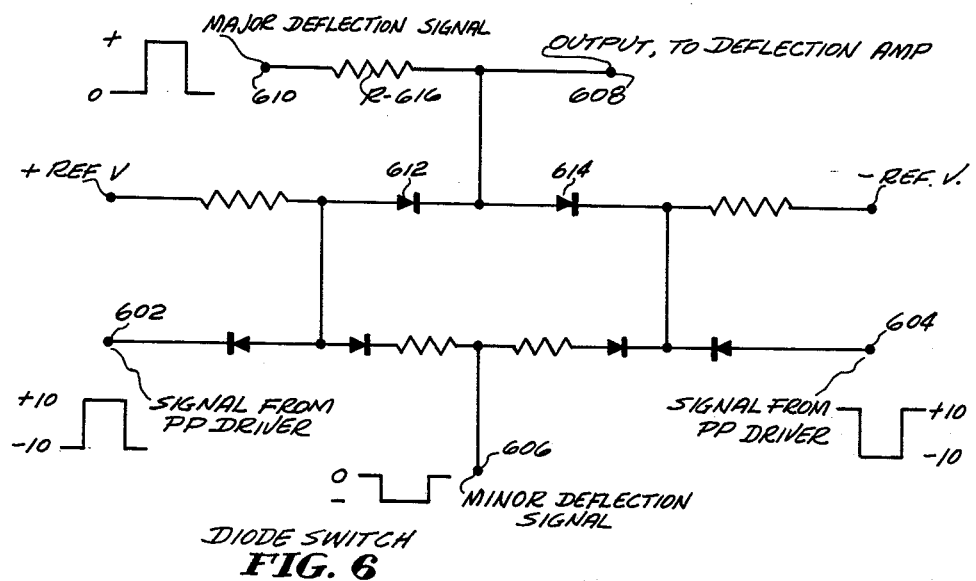
Figure 7:
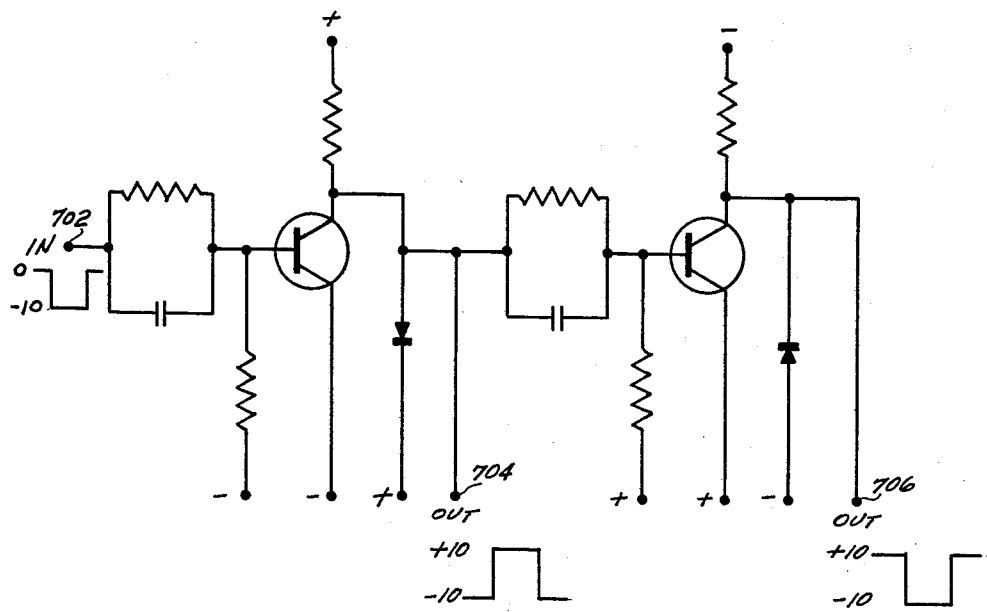

The novel features that I consider characteristic of my invention are set forth with particularity in the appended claims. The invention itself, however, both as to its organization, and its method of operation, together with additional objects and advantages thereof, will best be understood from the following description of specific embodiments when read in connection with the accompanying drawings, in which:

FIG. 1A shows the face of a cathode ray tube divided into a plurality of areas in which characters may be shown, FIG. 1B illustrates the relationships between a sub-origin or reference point and a plurality of dots making up a character, FIG. 1C is a block diagram illustrating the general layout of a preferred embodiment of the invention, FIG. 2A is part of a more detailed block diagram serving to illustrate the relationships between the various input components used with the present invention as well as some of the pulse forming components thereof, FIG. 2B is a block diagram illustrating further relationships between various components of a preferred embodiment of the instant invention, FIG. 2C is a block diagram illustrating the relationship between additional components of a preferred embodiment of the instant invention, FIG. 2D provides a table to aid in identifying the various blocks, in FIGS. 2A through 2C, which do not correspond to conventional symbols, FIG. 2E illustrates an embodiment of the invention which provides quantized signals by digital means for generating minor deflection signals, FIGS. 3A–3D show examples of the types of symbols which may be produced by the instant invention as well as showing the relationship between the sub-origin and the dots forming the characters, FIG. 4 illustrates a particular precision transistor switch which is of use in the practice of the instant invention, FIG. 5 illustrates a particular circuit which may be utilized to provide for the major deflections required for a preferred embodiment of the instant invention, FIG. 6 illustrates a precision analog diode switch which may be used in the practice of the instant invention, and FIG. 7 is a diagram of a push-pull driver circuit, such as may be used in the practice of the instant invention.

Turning now to a detailed discussion of the figures, it will be noted that FIG. 1A shows the face, at 10, of a standard cathode ray tube. The visible portion of face 10 may be divided for convenience of explanation into a plurality of imaginary squares or rectangles, 40 of which are shown in FIG. 1A, although a greater or lesser number may be employed and they may be arranged in different positions. Upon application of input signals to the invention from a computer output circuit or a card or tape reader, for example, a message will appear on face 10, with a single character contained within each rectangle for any given set of message input data. The individual characters of the message are formed successively, but the entire message remains visible on face 10 due to screen persistence. For example, the first character of a message may be formed within the area of rectangle 11, then the second character may be formed in the area of rectangle 12, etc., until the complete message is formed. It is not necessary, however, that the successive individual characters be formed from right to left, or from top to bottom; nor is it necessary that each successive character be formed immediately following formation of the character in an adjacent rectangle, although successive formation of adjacent characters involves smaller charges in certain major positioning voltages to be described and in general is advantageous.

In the formation of a single desired character within any particular one of the rectangular areas shown in FIG. 1A, an X major position voltage and a Y major position voltage are first applied to the deflection system of the CRT. These voltages are derived from the conversion of a plurality of input digit signals. Although the CRT is blanked when the two major positioning voltages are first applied, they are of proper magnitude and polarity to position the beam within the area defined by the particular rectangle where the desired character is to be written, so that later, when the CRT is unblanked, the beam will strike face 10 within the particular area.

Reference now should be had to FIG. 1B, where a single rectangular area of FIG. 1A is shown on an enlarged scale. X and Y major positioning voltages applied to the CRT deflection system effectively prepare the system to locate the beam at 20 in FIG. 1B, the sub-origin of area 11. FIG. 1B illustrates how the letter "P" may be formed. After the X and Y major positioning voltages are applied to the CRT deflection system and a certain time has elapsed, during which time the deflection voltages stabilize at the X and Y major values, a first set of $x$ and $y$ minor positioning voltages representing Cartesian coordinates are applied to the CRT deflection system to be superimposed respectively, on the X and Y major deflection voltages. If the first set of minor $x$ and $y$ positioning voltages has magnitudes indicated by the dimensions $x_1$ and $y_1$ in FIG. 1B, the deflection system of the CRT will be seen to be biased to locate its beam at point 21 in FIG. 1B. The CRT is then unblanked for a short period, so that a dot appears at point 21, and then the CRT is blanked again.

A second set of Cartesian positioning voltages, $x_2$ and $y_2$, are next applied to the deflection system in place of the $x_1$, $y_1$ set thereby preparing the deflection system to locate the beam at point 22 in FIG. 1B, and upon unblanking of the CRT a second dot appears at point 22. In the particular example chosen, the $x_2$ voltage will be the same as the $x_1$ voltage, since dot 22 is located directly above dot 21. The further dots arranged to form the letter "P" are then successively formed in similar manner so that the beam is effectively stepped around the path indicated by the arrows in FIG. 1B until it has provided the dot at point 23, the last dot required to form the letter "P." While the CRT is blanked, the minor x and y coordinate voltages are removed and the major X position voltage is then changed, relocating the potential position of the beam from the sub-origin of area 11 to the sub-origin of area 12 (FIG. 1A), preparatory to display of a further character in area 12. The further characters of the input message are formed in the other areas in the same manner, until the complete message has been indicated.

A general understanding of how the above process is performed will be facilitated by reference to FIG. 1C, a general system block diagram. The digital input data to be displayed is applied (over 19 lines in the specific embodiment to be described) from the computer or card or tape reader or other data-processing device to storage register means 30 shown in FIG. 1C as comprising three separate storage units, 31, 32 and 33. The input data applied to storage register means 30 may be applied serially or in parallel, and register 30 serves to present the data in parallel to the remainder of the system. A number of data-processing devices already contain suitable output storage registers which perform the function of register 30, and in such cases no further register is required.

The X position code storage unit 31 of register 30 consists of 7 digit stages, and receives input data over 7 lines. The binary or digital number applied to portion 31 of the register will determine the X major position, and hence determine in which area of a horizontal row of areas any particular character will be formed. The Y position code storage portion 32 of register 30 consists of 6 digit stages and receives input data over 6 lines. The digital number applied to storage portion 32 will determine the Y major position, and hence determine in which area in a vertical row of areas any particular character will be formed. Thus, together, the data stored in portions 31 and 32 of storage register 30 determine in which one of a plurality of areas (40 in a preferred embodiment, although $2^7 \times 2^6$ such areas are possible with 7 X-lines and 6 Y-lines) a character will be formed but have no effect upon the nature of the specific character to be displayed. It may be noted that the system just described uses storage registers 31 and 32 to operate in a mode which may be called the "position mode," since the area in which a character is to appear is uniquely determined by individual signals specifying X and Y coordinates. Another mode of operation, which may be called the "typewriter mode," may be used by employing X and Y major deflection counters at 31 and 32 which are started from the 0, 0 state and count upwards to obtain a position format like that a typewriter. The description of the invention is presented, for the sake of simplicity, as though only the "position mode" were possible, but it will be appreciated from the foregoing that a changeover of the operations described to the "typewriter mode" may be made without departing from the scope of the invention.

The character code storage portion 33 of storage register 30 contains 6 digit stages, and data stored in portion 33 determines the shape of the character to be displayed in the particular area defined by the data in portions 31 and 32. Thus the data stored or counted in portions 31 and 32 determine where on the face of the CRT a character is to be displayed, and the data stored in portion 33 determines what particular character is to be displayed. Each portion of register means 30 is connected to a reset or clearing line, which clears the register after one character has been displayed, enabling data pertaining to the location and type of the next character of the message to be entered into the register. In order to locate and form the character determined by the digital data stored in register 30, an initiating pulse is applied to the system on lines 38, 39 and 40. This pulse may be derived from the "Read" or "Print" circuit of the computer or other input device, and it will signify that data sufficient to determine a character has been supplied to register 30, and that a display of the character should be made.

The digital data stored in the X position storage portion 31 of register 30 is applied to an X major deflection computing unit 34 which is essentially a digital decoder and converter, and which provides an analog voltage of proper magnitude to position the CRT beam in the X direction to the sub-origin of the area in which the character is to be displayed. The digital data stored in the Y position storage portion 32 of register 30 is applied to a Y major deflection computing unit 35, which also is essentially a digital decoder and converter, and which provides a voltage of proper magnitude to position the CRT beam in the Y direction to the sub-origin of the area in which the character is to be displayed. The X and Y voltages from units 34 and 35 are applied through amplifiers 36 and 37 to drive the horizontal and vertical deflection systems, respectively, of the CRT 60.

No timing delays are provided between storage units 31, 32 and the CRT deflection system, so the deflection voltages are applied to the CRT essentially as soon as the character location data is entered into storage units 31 and 32. The digital number stored in character storage portion 33 of storage register 30 is applied to a character decoding unit 43 as soon as the data is present in unit 33. Character decoding unit 43 includes a matrix which converts the input data from unit 33 into a plurality of selected parallel switch controlling potentials. Decoding unit 43 is connected via 40 parallel lines to condition various of forty "x" diode analog switches represented at 44 and through 40 parallel lines to various of forty "y" diode analog switches represented at 45. Decoding unit 43 and diode switching groups 44 and 45 are thus arranged so that input data at unit 33 relating to a letter such as "A" will cause a particular x switch in unit 44 and a particular y switch in unit 45 to be conditioned while data relating to another letter such as "B" will cause a different pair of switches to be conditioned, etc. While the selected two switches in groups 44 and 45 are immediately conditioned as soon as data is applied to character code storage unit 33, no output voltages are applied immediately from the switches 44 and 45 to amplifiers 36 and 37.

After the initiating or "Display Order" signal is provided, and after a short time delay provided to allow the deflection system to settle, the pulse gates on a dot counter 46 are fed by a clock pulse oscillator 48 through an "and" gate 49, so that pulses are sequentially derived on successive ones of 10 output lines from the counter. The output pulses from the counter successively energize input conductors of a dot deflection generating unit 47, which is provided with 40 output lines connected to feed "y" diode analog switch group 44 and 40 output lines to feed "x" diode analog switch group 45. The function of dot deflection generating unit 47 is to apply sequentially to switch groups 44 and 45 a large number of analog potentials of different magnitudes. Those analog potentials which are applied to switches which have been conditioned are passed by the switches to amplifiers 36 and 37 and thence to the CRT deflection systems at 66 and 68. The switch groups 44 and 45 are arranged with respect to dot deflection generating unit 47 so that a single analog voltage will be applied to amplifier 36 and a single analog voltage will be applied to amplifier 37 at any one time. In between application of each set of analog voltages to amplifiers 36 and 37, clock pulse oscillator 48, after a further small delay, operates a blocking oscillator 50 which is connected to the grid cathode circuit of the CRT to unblank the CRT gun 64 and create a dot on the face of the CRT. Thus as the dot counter is stepped through its stages, different sets of dot positioning analog voltages are successively applied to the CRT deflection system. In the embodiment described, dot counter 46 was provided with a capacity of twenty counts, so that characters composed of as many as nineteen dots may be formed. Most characters require less than nineteen dots, therefore "turnoff" circuits 51, responsive to the character decoding unit 43 and the dot deflection generating unit 47 have been provided, to disconnect dot counter 46 after the required number of dots up to and including nineteen have been formed.

A CRT employing electrostatic deflection circuits is illustrated, but it will be appreciated that other display tubes employing other deflection and/or focusing systems may be used and that the invention may be employed with other display devices capable of using coordinate signals to produce either visible or latent images. In particular, it will be appreciated that a CRT having separate deflection means for major and minor deflections may be used.

Having in mind the general description of this invention set forth above in connection with FIG. 1A through FIG. 1C, a more detailed description will now be made in connection with the block diagrams of FIGS. 2A, 2B and 2C. FIGS. 2A through 2C may be considered as parts of a single figure and the conducting lines leading between FIGS. 2A, 2B and 2C have been drawn in such a way as to make it possible to more easily consider them as a unit. It will be recognized that the input signals to FIG. 2A and the output signals from FIG. 2B and FIG. 2C come from or are transmitted to conventional or standard equipment which is well known in the computer and data processing arts, as are the necessary power supplies, and therefore this equipment is not illustrated. The character codes and position codes made available as inputs to FIG. 2A, for example, may be derived from suitable tapes or other storage units or directly from the outputs of suitably coded computing or data processing equipment.

Turning first to FIG. 2A, consider that suitable code signals are made available as inputs (preferably 1 microsecond pulses) to counter triggers CT–6 through CT–24 in parallel approximately 2 micro-seconds after the display order is made available at a terminal 202 or that these inputs have been applied individually at various turns after the display order. The display order, generally a 1 micro-second pulse, may be provided either by hand or from suitable data processing equipment. The counter triggers will then be operated to provide the corresponding character codes to the diode matrix at 204 and the transistor switches TS–$1_p$ through TS–$13_p$ may be operated to provide signals to the major deflection resistor networks at 206 and 208.

Signals are then provided by resistor networks 206 and 208 to be supplied at terminals 210 and 212 of FIG. 2C to provide major deflections to a suitable cathode-ray tube such that the suborigin or reference point with respect to which each character is formed will be suitably determined. As previously indicated, the position codes are supplied to counter triggers CT–12 through CT–24 which are suitable flip-flop circuits of a type well known to those skilled in the art and which will pass a suitable pulse signal to the corresponding precision transistor switch TS–$1_p$ through TS–$13_p$ upon the occurrence of a suitable signal on the Y or X position code input terminals. The design of the transistor switches is a critical matter, since they are required to supply an accurately determined reference voltage from source 228 of FIG. 2B through line 214 to the X and Y major deflection resistor networks 206 and 208 whenever one of the transistor switches is operated by its corresponding counter trigger. A suitable example of circuitry for these transistor switches is described later in this disclosure in connection with FIG. 4. The output signals from the transistor switches are summed by suitable resistor networks such as those indicated in FIG. 5, and provide a suitable potential at terminals 210 and 212, respectively, to aim the gun in the cathode-ray tube at a desired suborigin point such as is indicated in FIGS. 3A–3D. It should be noted that the gun of the cathode ray tube will be blanked at the time of the selection of the suborigin and will remain so until such time as a suitable unblanking signal is provided by suitable circuitry such as that at 230 and 232 in FIG. 2B. It will be recognized that the major deflection circuits of FIG. 2A correspond to the X major deflection circuits 34 and the Y major deflection circuit 35 which were shown in FIG. 1C, with corresponding outputs made available to control the deflection circuits of a cathode-ray tube.

Having established the method employed and shown means for determining the major X and Y deflections to locate the suborigin points, we turn now to means for determining the minor deflections which are necessary to form the required characters and, more specifically, to means for providing the plurality of luminous dots which are necessary to the formation of those characters. The character code provided on the input terminals of counter triggers CT6–CT11 controls the output pulses of the counter triggers which are then provided over suitable connecting lines to the character decoding diode matrix 204. The character decoding matrix 204, in the present embodiment, is designed to provide an output pulse over any one of forty lines to provide a signal indicating that a chosen one of forty different characters has been designated by the character code. The possible characters in the preferred embodiment of this invention include the 26 letters of the English alphabet, the numerals 0 through 9, and special symbols +, —, ., and /. The operation of a character decoding diode matrix of the kind involved in element 204 is well known and reference is made to the book by R. K. Richards entitled "Digital Computer Components and Circuits" published by D. Van Nostrand Co. in 1957 and to pages 56 through 60 therein. Each of the forty terminals from the character decoding diode matrix 204 is connected to an "or" gate in FIG. 2B and also to a push-pull driver in FIG. 2C. The drawings in FIGS. 2A, 2B and 2C have been constructed in such a way that the lines from one figure to another may be readily followed, and the corresponding lines are labelled A, B . . . T, etc. corresponding to the signal appearing thereon to expedite the following of one line from one figure to another.

Consider now the circuitry of FIG. 2B, which is activated by signals from the components shown in FIG. 2A. The display order provided at terminal 202 of FIG. 2A is supplied, as shown, to a single-shot multivibrator, indicated in the block labelled SS–2, which may preferably provide a 15 microsecond delay prior to emitting a pulse in order to permit the major deflections of the cathode-ray to be completed and for the cathode ray to be settled to the required character suborigin position. A signal is supplied, over the appropriate line from the character decoding diode matrix of FIG. 2A, corresponding to that determined by the character code to an appropriate "or" gate indicated by the conventional half circle symbols in FIG. 2B. Taking, as an example, the letter T, the signal in the form of a pulse will be supplied to the input terminal T of an "or" gate 227 from which it will be supplied to the corresponding "and" gate indicated by the triangle 216. The "and" gate 216 will not be activated until a suitable signal is supplied at its terminal 10 from a dot decoding diode matrix 220. The "and" and "or" gates indicated herein may be conventional gates such as are illustrated in the book "Digital Computer Components and Circuits" by R. K. Richards, to which reference was previously made.

The display order signal on terminal 202 of FIG. 2A will be supplied to the counter trigger CT–25 of FIG. 2B which will be set to its "one" state to provide an input to an "and" gate 218 which will then provide a series of pulses from the free-running blocking oscillator 217 to provide a count signal to the dot binary counter made up of the counter triggers CT–1 through CT–5, and to activate an unblanking signal through the activation of units 230 and 232 as will be later explained. The counter triggers are coupled so that they may count up to 20 to provide a plurality of outputs to the dot decoding diode matrix 220. The diode matrix or distributor 220 may be of conventional design similar to the character decoding diode matrix 204 of FIG. 2A. The active output signals, on terminals 1 through 19, of the dot decoding diode matrix 220 are supplied one by one to power inverters $PI_1$ through $PI_{19}$ and to precision transistor switches indicated as TS–$1_x$ through TS–$19_x$ and as TS–$1_y$ through TS–$19_y$. The 20th terminal is connected directly to the last "and" gate 226, which provides a pulse to the "or" gate 222 whenever the dots forming either the letter "W" or the number "φ" have all be placed. Each of the output signals from the power inverters is supplied in succession to an "and" gate to prime it to operate the multiple "or" gate 222 if a signal is placed on the other gate terminal at the same time. The outputs from the power inverters are supplied to the "and" gates at terminals indicated at 2, 6, 7, 8, etc. and the other terminal of each "and" gate may receive a pulse supplied through an "or" gate by the character decoding diode matrix 204 of FIG. 2A. The occurrence of pulses on both terminals of any "and" gate simultaneously means that the required number of dots have been supplied for the formation of a particular character and will cause the "or" gate 222 to stop the system.

An example of the operation of the circuits described thus far may be taken using the formation of period "." signals, which require only a single dot, and which consequently call for a signal to the "or" gate 22 when both the pulse indicating "period" and the signal from the power inverter PI–2 are available on the "and" gate 224, which then supplies a pulse to the "or" gate 222. The "or" gate 222, in turn, supplies a turnoff signal through the inverter I–1 which resets CT–25 so that its "zero" portion conducts to operate the power driver PD–1 to reset the counter triggers CT–1 through CT–5 to zero.

As a further example, if the character code calls for the display of the character "T," a signal will be provided on the line from terminal T of the character decoding diode matrix 204 of FIG. 2A to the corresponding T on the "or" gate 227. Under these circumstances, the counter triggers CT–1 through CT–5 will continue to be activated by the count from the "and" gate 218 to provide signals through the diode matrix 220 and the pulse inverters PI–1 through PI–9 to the first nine pairs of transistor switches. These transistor switches will provide suitable minor deflections in both the X and Y directions to the cathode-ray tube as is explained hereinafter. On the occurrence of the 10th pulse to power inverter 10, however, a signal will appear on terminal 10 of "and" gate 216 opposite the pulse from the "or" gate 227 to provide a pulse from "and" gate 216 to operate the "or" gate 222 and to turn off the circuit through inverter I–1 and counter trigger CT–25.

There are two characters, W and φ, which, in this system, are composed of nineteen dots and thus require that the corresponding transistor switches TS–$19x$ and TS–$19y$ be driven, and consequently the cutoff for these letters is generated from output terminal 20 in cooperation with the output from the "or" gate 229 to operate the "and" gate 226 and the "or" gate 222 to reset the counter trigger 25 and to provide a pulse at its "0" terminal.

Following inversion of a pulse from the diode matrix 220 by one of the power inverters PI–1 through PI–19, the signal is transmitted through one of nineteen lines to connect to one of 19 transistor switches TS–$1_x$ through TS–$19_x$, to open one of said switches for a signal, to provide a minor X-deflection; and to one of 19 transistor switches TS–$1_y$ through TS–$19_y$ to open one of said switches for a signal to provide a minor Y deflection. These transistor switches then provide an input potential from a precision reference supply to one of a plurality of resistors, as exemplified by the resistors associated with the generation of the deflection signal for the X and Y deflection of T, which are labelled $T_x$ and $T_y$ in FIG. 2C. The precision reference supply is indicated at the block diagram 228 and it is of sufficient accuracy not to exceed a ±20 millivolt error and is as indicated, of negative polarity. The actual operation of the transistor switches is explained in some detail in connection with FIG. 4.

Considering now the FIG. 2C in more detail, we find that the negative potentials supplied by the transistor switches of FIG. 2B from the supply 228 are each applied to a plurality of resistor networks equal in number to the total number of characters which may be displayed, in this case 40. The negative potential from the first transistor switch is provided to the first resistor of all of these resistor networks, the negative potential from the second transistor switch is then provided to the second resistor of all of the networks except the network for generating the "period," to which only one potential is supplied; the potential from the third transistor switch is then provided to the third resistor of each resistor network having three resistors, etc.

To generate the "period" it is apparent from FIGS. 2A and 2B that the reference potential from transistor switch TS–$1_x$ to the first resistor in the $_x$ network will be transmitted from that network to the precision analog diode switch DS–$_x$ which was previously closed by the output signal on the "period" terminal from the character decoding diode matrix 204 of FIG. 2A through a push-pull driver PP–40. This reference potential will then be supplied to the terminal 210 to cause a minor deflection of the cathode-ray beam along the X axis away from the sub-origin. It will be recognized that at the time the minor deflection along the X axis is generated, a minor deflection along the Y axis will be generated by a potential through the TS–$1_y$ transistor switch to the $_y$ resistor network and the precision analog diode switch DS–$_y$ to the terminal 212. It should be recognized that the timing of these X and Y minor deflections is such that the minor deflections will have a chance to settle down to a steady-state before the single shot multivibrator SS–1 at 230 which provides a delay of one microsecond following each pulse from the free running oscillator 217, operates the blocking oscillator at 232 which unblanks the cathode ray beam for approximately 1.5 microseconds to permit the formation of a dot at the desired point on the cathode ray tube. The second pulse from the dot decoding diode matrix 220 will be supplied to the pulse inverter PI–2 and from there to TS–$2_x$ and the "and" gate 224. The pulse from the "period" or "." terminal of the character decoding diode matrix 204 will also appear on a terminal of the "and" gate 224, and the coincidence of the two pulses will provide a pulse which will operate "or" gate 222 and through inverter I–1, CT–25 and PD–1 will reset the dot counter to zero and prepare the circuit for the next display after forming only one dot.

It will be recognized that in the case of a character having more than one dot, which is the case for all except the "period," that each dot will be formed before the cathode-ray beam is deflected to form the succeeding dot, and that this is done through dot deflection resistor networks such as that associated with $T_x$ and $T_y$ in FIG. 2C. Considering the generation of the letter T, and further limiting the discussion to the consideration of the deflection along the X axis which is alike in principle to that along the Y axis, we find that the first potential supplied from the transistor switches, namely that from TS–$1_x$ is supplied to a first resistor indicated at R–230 in FIG. 2C and from there to the diode switch DS–$T_x$, which has been activated by the push-pull driver PP–20 acting in response to a signal from the character decoding diode matrix 204 in FIG. 2A, and more particularly from the terminal labelled "T" thereof. The output of DS-T$_x$, which is the precision potential from the resistor network as modified by the first resistor R-230 in said network and as it appears across the resistor R-234 is then supplied to the terminal 210 to provide the first minor deflection from the suborigin, where the suborigin has previously been determined by the major deflection networks in response to the position code. As indicated before, the Y deflection involves the same principles and occurs substantially simultaneously. After a short delay of about 1 micro-second to permit the beam to settle down in its new deflected position, a pulse will be provided from the single-shot multivibrator SS-1 at 230 to the blocking oscillator 232 which provides an unblanking pulse of about 1.5 micro-second width to generate the first dot on the cathode ray screen.

The generation of the second dot will then proceed in the same way after the cathode ray beam has been blanked, following the end of the unblanking pulse from 232, and the second precision potential has been supplied from precision reference supply 228 through the transistor switch TS-2$_x$ and through a second connecting line to the second resistor R-232 in the resistor network for T$_x$. The precision potential will be supplied through diode switch DS-T$_x$, which has been kept closed by the potential from the T terminal of 204, and to the terminal 210 to provide potential for a new deflection of the cathode ray beam. As before, a similar new deflection will be provided by the Y minor deflection circuitry. After a short period, determined by the delay occasioned by the single-shot multivibrator SS-1 at block 230 to permit the cathode ray beam to settle down, the gun of the cathode ray tube will be unblanked by the blocking oscillator at 232 and a second dot will be formed. This same procedure will be followed with respect to each of the nine dots which are used to make up the letter "T," and on the occurrence of the tenth pulse from the dot decoding matrix 220 of FIG. 2B, the pulse will be supplied (through a connection which has been omitted to keep the circuits uncluttered) to a terminal 10 of "and" gate 216, which in response to the potential on terminal 10 and a potential from "or" gate 227 occasioned by the presence of a signal from "T" on 204 will provide a pulse to activate the multiple "or" gate 222 which in turn will provide a turnoff signal to the inverter I-1 to switch CT-25 to its "zero" conduction state and provide a pulse through power driver PD-1 which will reset the dot binary counter made up of CT-1 through CT-5 to the zero state and prepare it for the next character.

A somewhat different approach to the problem of generating the required minor deflection potentials and for positioning the electron beam and thus positioning the dots, is illustrated in FIG. 2E. It will be recognized that the steps of generating the minor deflections through the use of the dot deflection resistor networks of FIG. 2C provide step-function approximations of the ideal location of each dot. The circuitry of FIG. 2E makes a further approximation of this step-function approximation, in that the essentially digital generation of the latter figure provides step-amplitudes which are quantized. This, of course, produces the familiar dot-matrix type of character. However, if the character field is quantized with 128 positions in each direction, requiring two seven-bit numbers for dot position representation, positioning will be approximately equal to the one percent deviation which may be obtained by the use of the analog system. If the same spot size is retained as in the analog system, and the analog dot positions are duplicated to the nearest quantized value, the difference in the characters formed will be negligible.

The writing of any of the previously specified characters by either system, will require the generation of from one to nineteen dots, and assuming an average of 11, each of which requires a position description of 14 bits, for 40 characters, a total of 6,160 bits of information must be made available in storage. If the required characters are specified before construction of the display unit, this storage may be of the type in which a pattern of drive wires codes a core switch by passing through cores for "ones" and outside for "zeros." Thus the memory will be in the patterned leads, and not in the cores themselves, which merely respond to a pulse on the appropriate patterned lead.

The embodiment of the memory in FIG. 2E requires that 560 memory cores be provided, in 40 sets of 14 cores, one set for each character and with no more than 19 drive pattern wires through any one set of cores. For random addresses this will require no more than 10 wires through any one core, plus a readout winding, and, if required, a bias line.

This circuit may be connected to the dot decoding diode matrix 220 of FIG. 2B which will provide signals from terminals 1 through 20 as heretofore explained. Each output pulse will be transmitted over lines 253, 255, etc., as shown, to all forty sets of cores in the figure and through the one set of cores which has been prepared for its reception by the reception of a signal from the character decoding diode matrix 204 by one of the associated character switches CS-1 through CS-40. In each case, the signal pulse will be supplied to the appropriate magnetic cores by the windings through those cores to activate them in accordance with the requirements of the code. To illustrate the operation of the digital character generator, we turn to the example of what happens when a pulse is received from 220 at character 1. In such a case, only the cores 252 and 260 would appear to be activated by the pulse, with character switch CS-1 operative, though it will be recognized that one or more of the 11 cores not illustrated might be activated. In any case, following the activation of the required cores in accordance with the code signal, the read amplifiers at 262 will be activated to read "pulse" or "no pulse" on each of the corresponding 14 cores to provide signals to the latches at 264, and to the 14 precision switches at 266 to provide reference potentials from the source 268 to each of the seven-bit digital to analog converters at 270 and 272. The digital to analog converters will then provide the minor deflections required to the X and Y amplifiers 274 and 276 respectively. The latches, read amplifiers, memory cores, etc. of this circuit are all elements which are well known in the art.

It may be noted that, in theory at least, a minimal unit, of the general type illustrated in FIG. 2E, may be built using only 14 large tape cores, with all the lines required for the forty characters through them in accordance with the requirements of the code, and with connect type selection switching for choice of a desired character.

The basic logic of the circuit in FIGS. 2A, 2B and 2C will be the same as that required for the operation of the circuit in FIG. 2E, in that all the character outputs are formed in potential form, the circuits to start and stop the sequences will be much the same, and the desired characters are chosen by a translating switch driven by the character code.

An embodiment of the invention which is of considerable practical interest is one in which the display field available on the screen of the cathode-ray tube used is designed to have a maximum resolution of 1,024 positions in each axis. Each of these 1,024 positions may be used for the resolution of an arbitrary pattern of lines as, for example, a map display. Of these positions, approximately $2^6$ or 64 equidistant values may be used for the Y, or Row, axis positions, to form a tabular display of characters, and approximately $2^7$ or 128 values may be used for the X or Column axis positions. For display tubes having a diameter of 21", such a tabular display field would result in the formation of characters approximately ⅛" in height. Good definition and brilliance of the display is obtainable for characters of this size.

As previously explained, this display is one in which each character is formed by a sequence of luminous dots, where the electron beam of the display tube is held motionless during an unblanking interval, during which a dot is formed on the screen, and then is rapidly deflected to a new dot position adjacent to the previous position, with the beam blanked. One method of determining the position of successive dots is by the generation of a step function approximation of the X and Y component voltages of the characters, followed by the writing of a dot onto the display screen during the flat-top portion of each step. The general appearance of such characters, formed of a relatively small number of dots is illustrated in FIG. 3, where the suborigin is taken to be at the plus sign appearing in the upper right hand corner as shown with respect to each of the characters A, B, W and S. It will be seen that characters generated in this manner, for the equivalent number of dot elements, are superior in definition to characters which could be formed from a matrix of dots whose positions are fixed, as in a dot printer, and are superior in the Y dimension to the line segments used in a raster type display. This improvement is obtained by positioning successive dots to any required locations within a character field either by analog means or digital means.

In a display of this type, the successive dot positions may be established such that sufficient overlap occurs so that relatively uniform illumination will occur along the trace line of the displayed character, as illustrated in FIGS. 3A–3C. Since the primary electron beam of the display tube is used, rather than a shaped beam or a beam which has to undergo a plurality of deflections, the design of deflection equipment is not critical, and beam intensity may be increased to limits determined by phosphor loading, to provide a brightly luminous display. In some instances, particularly to maintain definition in small images, it may be desirable to maintain the individual dots as distinct elements. This has been done in actual operating models as indicated in FIG. 3D, which shows a greatly enlarged image of "S" as it appears in a photograph of a tube screen employing the invention.

In the mechanization of a display system such as the one used in the present invention, a primary concern is with the accuracy with which each dot in any character can be positioned on the screen of the oscilloscope. The accuracy becomes all the more important to consider where, as in the present invention, the maximum deflection from the suborigin to any dot in a character is provided by less than one volt. In order to help obtain the reuired accuracy, a precision voltage source is used to provide the basic potential which provides the deflection, together with transistor switches such as those illustrated in FIG. 4 which can supply the precision voltage at selected inputs of the resistor networks of FIG. 2C. Turning to the portion of the system block diagram shown in FIG. 2B, it may be pointed out that, with the exception of outputs 0 and 20, the dot counter outputs are negative going pulses which from 0 to −10 volts which drive power inverters which in turn drive the transistor switches. It may be noted parenthetically at this point that the output marked 0 in the dot decoding diode matrix 220 represents the idle state of the counter when all of the counter flip-flops are reset to the '0' position, and that this output is not used anywhere. Since the maximum number of dots in any character is 19, outputs 1 through 19 are used for character generation. Output 20 is used in the logic where the dot counter is reset, at the end of each character, by the $(n+1)$th pulse, where $n$ is the number of dots in the character.

The power inverters of FIG. 2B are required not only for power gain, but also to invert the pulse polarity, since a negative going pulse is required at each of the inputs to the resistor networks and the transistor switches have the property of inverting the signal. The power inverters modify the negative going pulses from 0 to −10 volts of the dot counter outputs to positive going pulses from −10 volts to 0 which are provided as inputs to the input terminals of the transistor switches as shown in FIG. 2B and also at terminal 402 in FIG. 4. Each of these transistor switches consists of two transistors having two common emitter circuits using complementary transistors with collectors interconnected to form the output terminal. When the input on terminal 402 is −10 volts, the PNP transistor conducts and the output is at ground level, except for the voltage drop across the transistor of less than 50 millivolts. With the input on terminal 402 at ground, the NPN transistor is in conduction and the output is at −10 v., except for the voltage drop across the transistor of less than 50 millivolts. The switch thus inverts the polarity of the incoming pulse and feeds a negative pulse to the resistor summing networks from terminal 404 with constant voltage levels. The −10 volt supply to which the emitter of the NPN transistor is connected via terminal 406 is a specially designed precision voltage supply, as previously indicated, with a maximum variation in its output voltage of +20 millivolts.

The resistor summing networks for minor deflections must be quite accurate; involving 1% resistors, but are connected in fairly well known circuits. Corresponding to each character there are two resistor summing networks, one for the horizontal or $x$-deflections of dots and the other for the vertical or $y$-deflections, both being measured from the suborigin of the character. The transistor switches are identified not with the character but with the dot, thus, transistor switch TS–$1_x$ in FIG. 2B isassociated with the $x$-deflection of the first dot of every character and will drive the $x$-resistor networks, $A_x$, $B_x$, etc., of all the characters. Similarly, transistor switch TS–$1_y$ will drive all the $y$-resistor networks, $A_y$, $B_y$ . . . etc. Transistor switches TS–$2_x$ and TS–$2_y$ will drive all the $x$-resistor and $y$-resistor networks, except for the resistor network for character "period" which contains only one dot. It can be seen that transistor switches TS–$19_x$ and TS–$19_y$ will drive the resistor networks of only two characters, W and $\phi$, which are the only two characters composed of 19 dots each. Thus the loading on the transistor switches would be variable, the switches associated with the first dot carrying the heaviest load. However, as theoretically predicted and experimentally verified, the voltage drop across either transistor in the transistor switch does not vary more than 50 millivolts under widely varying load conditions. By operating the transistor switch between ground and a precision −10 volts voltage source, it is assured that the input voltage at any terminal of any resistor network is either 0 or −10 volts, within ±50 millivolts. The output voltage from the resistor network (see the resistor circuits associated with $T_x$ and $T_y$ in FIG. 2C) is given by:

$$E_0 = \frac{E_x}{R_x} \cdot \frac{1}{\frac{1}{R_1}+\frac{1}{R_2}+ \cdots +\frac{1}{R_x}+ \cdots +\frac{1}{R_n}+\frac{1}{R_0}}$$

where $x=1, 2, \ldots, n$, since only one voltage input is received at a time. In the practice of the instant embodiment of the invention, $E_x$ is a constant (−10 volts) and the sum of all the conductances is also constant for a particular character. Thus, the output voltage is inversely proportional to the value of the resistor which has the input signal. Assuming that the sensitivity of the oscilloscope remains constant, the deflection is seen to be inversely proportional to the resistor value. Since the number and positions of dots with respect to the suborigin is different for different characters, the sun $$1/R_1+1/R_2+ \ldots +1/R_n$$

will be different for different characters. However, if a given input voltage $E_x$ at the input of a resistor $R_x$ is to produce the same output voltage regardless of what the rest of the resistor network looks like, the terminating resistance $R_0$ must be so chosen that the sum $$1/R_1 + 1/R_2 + \ldots + 1/R_n + 1/R_0$$

is constant for all characters. This insures that $$E_0 = k/R_x$$

where $k$ is a constant. The design of resistor networks thus involves choosing resistors $R_1, R_2, \ldots R_n$ inversely proportional to the minor deflection and choosing $R_0$ such that the sum $1/R_1 + 1/R_2 + \ldots + 1/R_n + 1/R_0$ is constant for all characters. For convenience, $R_0$ associated with the $x$-deflection of dots in character W was chosen to be infinite, since the sum $$1/R_1 + 1/R_2 + \ldots + 1/R_n$$

is maximum for this case. To find $R_0$ for either $x$ or $y$ deflection resistor network for any character, the sum $1/R_1 + 1/R_2 + \ldots + 1/R_n$ for that particular resistor network is subtracted from the corresponding sum for the $x$-deflection resistor network of W to yield the inverse of the desired resistance $R_0$.

The preceding discussion has shown how the resistor networks for the minor deflection signals are obtained. The major deflection signals are obtained using resistor-divider networks such as are shown in FIG. 5. Resistors R–11, R–12, ... R–17 in FIG. 5 are selected to be equal value and resistors R–21, R–22 ... R–25 are selected to be one-half that value. As a result of this selection, the output potential $e_Y$ appearing across terminals 500–502 may be expressed according to the following equation:

$$e_Y = K\left(e_1 + \frac{e_2}{2} + \frac{e_3}{4} + \frac{e_4}{8} + \frac{e_5}{16} + \frac{e_6}{32}\right)$$

where $e_1, E_2 \ldots e_6$ are output potentials of TS–$1_p$ through TS–$6_p$, K is a constant and $e_Y$ is the major Y deflection potential. The major X-deflection potentials appearing across terminals 504 and 506 may be determined in substantially the same way as indicated sketchally in FIG. 5. It will be recognized that the various potentials supplied to the transistor switches indicated by block diagrams TS–$1_p$ through TS–$13_p$ are as shown in FIG. 4.

The task of mixing the major and the minor deflections of a character and impressing the sum on the oscilloscope $x$ and $y$ inputs at the proper time may be accomplished by the circuit illustrated in FIG. 6, in which the connection of the major deflection signals is made to the amplifiers of the oscilloscope, through a mixing resistor R–616, to be mixed with the minor deflection signals. With each character are associated two diode switches: one for the $x$-deflections of the dots in the character and the other for the $y$-deflections. Let it be assumed that the writing of a selected character has just been finished. The character register, CT–6 through CT–11, receives an input X position code which sets it, for example, to the "B" position and the "B" output (see block diagram, FIG. 2A and FIG. 1C) drives the associated push-pull driver, of FIG. 2B, which impresses control signals at terminals 602 and 604 of each of two diode switches (one for $B_x$ and the other for $B_y$), with polarity as shown in FIG. 6. This "closes" the diode switch, and the input signals consisting of minor deflections will appear at the output 608 with slight attenuation. As the dot counter starts its count, minor deflection signals are received at input 606 of FIG. 6 and appear at the output 608 which is connected to the appropriate terminal of either the $x$ or the $y$ input of the oscilloscope. The minor deflection signals, as has been shown previously, are proportional to the deflections of the dots as measured from the suborigin of the character. The major deflections come from deflection resistor networks such as are shown in FIG. 5 and may be applied at terminal 610. Having written the last dot in B, the next dot counter pulse resets the dot counter and places the equipment in readiness to receive the next character code which may be T, for example. This opens the diode switches for B and closes the diode switches for T. Each selected character is thus successively generated.

The majority of the electronic components for which the blocks in the block diagram stand are conventional circuits, which have been adapted to operate under certain load conditions with the power and the input signals supplied by the other portions of the exemplary circuit. The majority of these circuits are not discussed in detail, therefore, but a few of them are illustrated in order to point out particular circuits which may be used in the practice of this invention. It is appreciated that much or all of the circuitry of this preferred embodiment of the invention might be replaced by equivalent circuitry derived from such sources as the book by G. A. Korn and T. M. Korn entitled "Electronic Analog Computers," 2nd edition, 1956, McGraw-Hill Book Co., the article by J. Millman and T. H. Puckett entitled "Accurate Linear Bidirectional Diode Gates" from the Proc. of I.R.E., vol. 43, pp. 27–37, January, 1955; Richard's book entitled "Digital Computer Components and Circuits," to which reference was previously made; or from other sources in the extensive literature pertaining to digital and analog computers and data processing devices.

Among the more critical elements, as they pertain to a preferred embodiment, are the precision analog diode switches, one of which is illustrated in FIG. 6. One requirement of the diode switches is that they have a high back impedance, since 40 of them are connected together at their output terminals. In order to provide a high back impedance, silicon diodes are used at 612 and 614 in the output arm of the diode bridge. It will be noted that terminals 602 and 604 have oppositely poled pulses applied to them from the push-pull drivers, which serve to bias the diodes shown to permit the sum of the pulse inputs on terminals 606 and 610 to be transmitted to output terminal 608. These switches have been made in such a way that the output potential on terminal 608 is a very accurate reflection of the input on terminal 606 in the case where the minor deflection is the only one applied, and will accurately sum the major and minor deflection signals if both of them are applied to provide an output at terminal 608.

The control signals to the diode switches are provided by push-pull drivers PP–1 through PP–40 which may be of the general form illustrated in FIG. 7. This circuit uses two complementary-type common emitter circuits connected in tandem. Inputs to the push-pull drivers come from the character counter 204 of FIG. 2A and are negative-going pulses of from 0 to −10 volts. Two outputs are available from each of these circuits at terminals 704 and 706 which are signals in push-pull. The first output, appearing on terminal 704, is a positive-going 20 volt pulse going from −10 to +10 volts. The other output, appearing on terminal 706, is a negative-going 20 volt pulse from +10 to −10 volts. These outputs are connected to the control terminals of the diode switches to "open" or "close" the switches.

Having set forth specific details as to the means used and the general mode of operation of a preferred embodiment of this invention, a brief resume of the mode of operation for the display of a single character is now presented. In the preferred embodiment, a display order pulse of 1 microsecond duration is furnished to reset counter triggers CT–6 – CT–24 and to drive a single-shot multivibrator SS–2. Approximately 2 microseconds after the display order has been provided, the character code and the $y$ and $x$ position codes are inserted in parallel, in the form of 1 microsecond pulses, to set the appropriate unit of CT–6 – CT–24. The set units of CT–12 – CT–17 operate corresponding transistor switches TS–$1_p$ through TS–$6_p$ to drive a precision deflection resistor network 206 to furnish the major deflection voltage for Y-axis deflection, and similar procedures follow for the X-axis deflection. A 15 microsecond delay is furnished by the single-shot multivibrator SS-2 which is utilized to permit settling of the deflection system to the required character suborigin position. Simultaneously counter triggers CT-6 – CT-11 drive the Character Decoding Diode Matrix to energize the chosen one of the 40 character outputs, which in turn drives the corresponding push-pull driver PP-1 through PP-40 to operate the associated X and Y diode switch unit. Since, however, the Dot Counter made up of CT-1 – CT-5 is reset to the zero stage, no output will appear through the operated diode switches at this time.

Upon the completion of the SS-2 delay, counter trigger 25 will be set to its "one" state, opening a gate from the blocking oscillator 217, and removing reset from the Dot Binary Counter, composed of CT-1 – CT-5. This counter will be advanced through 20 states, except for the occurrence of the turn-off signal which, in most cases, will occur at some earlier state, which is that represented by the number of dots utilized in the display of the chosen character, plus one. As the Dot Counter passes through each state, the corresponding power inverter PI-1 through PI-19 operates the associated X and Y Transistor Switches, each of which drives the corresponding resistor of each of the Dot Deflection Resistor Networks. For example, in position "1" of diode matrix 220, PI-1 operates to drive TS-1$_x$ and TS-1$_y$ which drive the first resistor in all 40 X and all 40 Y networks, respectively. The signal appearing across the X network for the first dot of the character "T," for example, will then pass through DS-T$_x$ if the latter has been activated by 204, and similarly for the Y network, through DS-T$_y$ to add a minor deflection voltage to the previously established major deflection voltage.

Simultaneously with this positioning of the beam within the character space, the clock signal will drive the single-shot multivibrator SS-1 to furnish a 1 microsecond settling delay for the dot circuitry, and then will drive a Blocking Oscillator unblank pulse generator, which causes the dot to be displayed on the screen of the oscilloscope tube. A similar process occurs for each succeeding dot, until the required number of dots have been sequentially placed to write the chosen character.

When the Dot Decoding Matrix reaches the state following that of the final dot of the character, the output of an appropriate pulse inverter will drive an "and" gate, whose other input has been armed by the chosen character, as indicated by the output of the Character Decoding Matrix. The output of this "and" gate passes through a multiple "or" gate to furnish a turn-off signal which passes through an inverter I-1 to reset CT-25, whose "zero" output then passes through the power driver PD-1 to reset the Dot Counter, and thus end the character cycle.

It will be recognized that the instant invention may be used in conjunction with other apparatus, such as high speed photographic equipment, which may make permanent records of messages appearing on the face of the tube for storage or projection. It case only direct visual inspection of the display is desired, it will be possible, of course, by the use of existing devices such as recycled magnetic recordings to repeat a given message any desired number of times until the image has been caused to persist long enough to be clearly registered by the eyes of observers.

It will be recognized also that the instant invention may operate in more than one mode. One of these, which has been described in detail, may be called "position mode," in which each input code word will need to include both character selection information and position address information. The second mode might be called a "typewriter mode" in which the character selection information only is furnished in each input code word, and the position address information is obtained from X and Y major deflection counters, which are started from the 0, 0 state and counted upwards to obtain a position format like that of a typewriter. The "typewriter mode" may be practised with the above described embodiment of the instant invention by reconnecting registers CT-12 – CT-17 and CT-18 – CT-24 of FIG. 2A to form two counters and applying suitably spaced pulse inputs to said counters.

Having set forth the general nature of a preferred embodiment of the instant invention and its modes of operation, it is apparent that a number of advantages over the prior art devices will be found in the practice of this invention. In the first place, this invention makes possible a display having very superior definition which uses circuits employing elements of simple and dependable types. The circuit may use a standard cathode-ray tube for display purposes and the system is adaptable to improved, or special-purpose tubes or other display devices as desired. The system is adaptable to the display of any desired set of characters by the simple expedient of providing an appropriate set of dot deflection resistor networks. The invention is adaptable to miniaturization techniques so that a very small and light display system can be constructed, since no heavy components or components of fixed size need be utilized. The invention provides a display having greater brilliance than is possible with any of the prior art devices, a display which is of particular use where the ambient light is great or where projection is desirable. The invention is more flexible than the prior art devices, since the shape, the size, or the nature of a character may be modified by simply plugging in different resistor cards associated with the minor deflection signals.

It will thus be seen that the objects set forth above, among those made apparent from the preceding description, are efficiently attained. Since certain changes may be made in carrying out the above method and in the constructions set forth without departing from the scope of the invention, it is intended that all matter conained in the above description or shown in the accompanying drawing shall be interpreted as illustrative and not in a limiting sense.

Having described my invention, what I claim as new and desire to secure by Letters Patent is:

1. In a display device including a cathode ray tube having a deflection means, apparatus for generating signals to deflect an electron beam to selected dot positions for forming a display of character, said apparatus comprising a pair of potential dividing resistive networks each coupled between a first reference potential and a second reference potential and each having a series connection point, each of the potential dividing networks including a first resistor coupled between the first reference potential and the series connection point, each of the potential dividing networks further including a plurality of ratio resistors, a sequencing switching means for coupling the ratio resistors in sequence between the second reference potential and the series connection point, and another switching means for directly coupling the signals from the series connection points of both potential dividing networks to the cathode ray tube deflection means.

2. In a display device including a cathode ray tube having a deflection means, apparatus for generating signals to deflect an electron beam to selected dot positions for forming a selected character, said apparatus comprising a plurality of potential dividing resistive networks arranged in pairs, each resistive network being coupled between a first reference potential and a second reference potential and having a series connection point, each potential dividing network including a first resistor coupled between the first reference potential and the series connection point, each potential dividing network further including a plurality of ratio resistors, a first switching means for sequentially coupling the ratio resistors between the second reference potential and the series connection point, and second switching means for directly coupling the signals from the series connection points of a selected pair of the potential dividing networks to the cathode ray tube deflection means.

3. Apparatus in accordance with claim 2 wherein the first switching means comprises a plurality of transistors each coupled between the second reference potential and a respective one of the ratio resistors of a plurality of the resistive networks, and wherein the second switching means comprises a plurality of diode switches each coupled to selectively pass the deflection signals from a respective one of the resistive networks directly to the cathode ray tube deflection means.

References Cited in the file of this patent

UNITED STATES PATENTS

| | | |
|---|---|---|
| 2,914,758 | Retzinger | Nov. 24, 1959 |
| 2,931,022 | Triest | Mar. 29, 1960 |
| 2,932,017 | Prince | Apr. 5, 1960 |
| 2,942,251 | Shanahan | June 21, 1960 |